United States Patent
Miyazawa et al.

(10) Patent No.: US 9,033,422 B2
(45) Date of Patent: May 19, 2015

(54) VEHICLE SEAT

(75) Inventors: Masaaki Miyazawa, Kanagawa (JP); Ikuo Kondo, Kanagawa (JP)

(73) Assignee: Johnson Controls Technology Company, Holland, MI (US)

( * ) Notice: Subject to any disclaimer, the term of this patent is extended or adjusted under 35 U.S.C. 154(b) by 18 days.

(21) Appl. No.: 13/988,747

(22) PCT Filed: Nov. 22, 2010

(86) PCT No.: PCT/JP2010/070763
§ 371 (c)(1),
(2), (4) Date: May 21, 2013

(87) PCT Pub. No.: WO2012/070095
PCT Pub. Date: May 31, 2012

(65) Prior Publication Data
US 2013/0241257 A1    Sep. 19, 2013

(51) Int. Cl.
*B60R 22/00*    (2006.01)
*B60N 2/30*    (2006.01)
*B60N 2/015*    (2006.01)
*B60N 2/68*    (2006.01)
*B60R 22/26*    (2006.01)
*B60R 22/02*    (2006.01)

(52) U.S. Cl.
CPC .......... *B60N 2/3043* (2013.01); *B60N 2/01583* (2013.01); *B60N 2/3011* (2013.01); *B60N 2/688* (2013.01); *B60R 22/26* (2013.01); *B60R 2022/021* (2013.01)

(58) Field of Classification Search
USPC .......................... 297/314, 472, 14; 296/65.03
See application file for complete search history.

(56) References Cited

U.S. PATENT DOCUMENTS

| 3,938,627 | A | * | 2/1976 | Nagazumi | 188/371 |
| 4,488,754 | A | * | 12/1984 | Heesch et al. | 297/216.18 |
| 4,824,175 | A | * | 4/1989 | Tokugawa | 297/473 |
| 4,993,778 | A | * | 2/1991 | Colin et al. | 297/452.2 |
| 5,303,983 | A | * | 4/1994 | Gauger et al. | 297/472 |
| 5,468,053 | A | * | 11/1995 | Thompson et al. | 297/472 |
| 5,507,552 | A | * | 4/1996 | Ineich et al. | 297/216.1 |
| 5,577,805 | A | * | 11/1996 | Glinter et al. | 297/378.12 |
| 5,662,367 | A | * | 9/1997 | Rastetter et al. | 296/65.03 |
| 5,984,397 | A | * | 11/1999 | Dawson et al. | 296/65.09 |
| 6,499,786 | B2 | * | 12/2002 | Takahashi | 296/65.03 |
| 6,843,526 | B2 | * | 1/2005 | Honda et al. | 297/14 |
| 7,222,907 | B2 | * | 5/2007 | Lutzka et al. | 296/65.03 |

(Continued)

FOREIGN PATENT DOCUMENTS

| GB | 2 206 946 A | 1/1989 |
| JP | 01-098031 | 6/1989 |

(Continued)

OTHER PUBLICATIONS

International Search Report in PCT/JP2010/070763 dated Feb. 1, 2011.

(Continued)

*Primary Examiner* — David E Allred
(74) *Attorney, Agent, or Firm* — Foley & Lardner LLP

(57) ABSTRACT

One lower end portion of a belt anchor bracket is supported on a lock unit rotatably in a front-rear direction, the other lower end portion of the belt anchor bracket is fixed to a leg, and a seatbelt anchor is supported on an upper end portion of the belt anchor bracket rotatably in the front-rear direction.

3 Claims, 7 Drawing Sheets

(56) References Cited

U.S. PATENT DOCUMENTS

| | | | |
|---|---|---|---|
| 8,287,024 B2 * | 10/2012 | Sayama | 296/65.03 |
| 8,562,060 B2 * | 10/2013 | Kato et al. | 296/65.12 |
| 2002/0033624 A1 | 3/2002 | Konishi et al. | |
| 2002/0070853 A1 | 6/2002 | Sakai et al. | |
| 2005/0230995 A1 * | 10/2005 | Tame | 296/65.03 |
| 2006/0061196 A1 * | 3/2006 | Rausch et al. | 297/463.1 |
| 2010/0176629 A1 * | 7/2010 | Yamada et al. | 297/216.1 |

FOREIGN PATENT DOCUMENTS

| | | |
|---|---|---|
| JP | 11-099908 | 4/1999 |
| JP | 2001-278008 A | 10/2001 |
| JP | 2004-161037 | 6/2004 |
| JP | 2009-279963 | 12/2009 |
| JP | 2010-052451 A | 3/2010 |
| JP | 2010-149804 | 7/2010 |

OTHER PUBLICATIONS

Supplementary European Search Report dated Aug. 14, 2014 in corresponding European Application No. 10 859 979.6, 4 pages.

Office Action dated Feb. 2, 2015, in corresponding Chinese application No. 201080070283.7, 6 pages.

* cited by examiner

VEHICLE SEAT

CROSS REFERENCE TO RELATED APPLICATIONS

The present application is a National Stage of International Application No. PCT/JP2010/070763 filed on Nov. 22, 2010, the entire disclosure of which is incorporated herein by reference.

TECHNICAL FIELD

The present invention relates to a seat for a vehicle such as an automobile.

BACKGROUND ART

As a related vehicle seat, there is a seat designed such that a lateral part of the seat on a vehicle body side is supported by a hinge mechanism so as to be rotatable between a position at which the seat is raised and a position at which one can sit thereon, and a lock device is provided to a leg of the seat given on the opposite side thereof from the vehicle body, i.e. the cabin side (see Patent Literature 1). The lock device is formed of front lock means and rear lock means which are capable of engaging with front and rear engagement members fixed to a floor panel. While the rear lock means is in an engaged state, the front lock means is in a disengaged state, but the front lock means can be moved into engagement with the front engagement member by given lifting load applied to the seat cushion in a rear collision.

CITATION LIST

Patent Literature

[PTL 1] Japanese Unexamined Patent Application Publication No. 2010-149804

SUMMARY OF INVENTION

According to this related technique, as a structure to support the seat on the floor, the two lock means are operated in conjunction with each other so as to securely lock the seat. However, in the case where seatbelts for three passengers are disposed, a seatbelt anchor load of 1.5 passengers may be applied to each of the lock means and the leg. If the strength of each of the lock means and the leg is to be enhanced to make them able to withstand such seatbelt anchor load, not only may their weights be increased but also their manufacturing costs may be increased.

An object of the present invention is to provide a vehicle seat with a seatbelt anchor having improved strength without increasing the manufacturing costs of lock means and a leg.

SOLUTION TO PROBLEM

An aspect of the present invention is a vehicle seat including a seat cushion having one side supported on a side panel of a vehicle rotatably in a left-right direction of the vehicle, a leg hanging downward from the other side of the seat cushion and being capable of horizontally holding the seat cushion on a floor panel of the vehicle, a lock unit engageable with and disengageable from an engagement member provided to the floor panel, and a belt anchor bracket having a first lower end portion supported on the lock unit rotatably in a front-rear direction of the vehicle, a second lower end portion fixed to the leg, and an upper end portion supporting a seatbelt anchor rotatably in the front-rear direction.

According to the above aspect, the first lower end portion of the belt anchor bracket is supported on the lock unit rotatably in the front-rear direction; the second lower end portion of the belt anchor bracket is fixed to the leg; and the seatbelt anchor is supported on the upper end portion of the belt anchor bracket rotatably in the front-rear direction. Thus, in a normal state where no load is applied to the seatbelt anchor, the leg holds the seat cushion substantially horizontally. In a sudden braking state where load is applied to the seatbelt anchor, the belt anchor bracket is deformed, so that the upper end portion of the belt anchor bracket supporting the seatbelt anchor is moved toward the front side. By the deformation of the belt anchor bracket, the impact energy can be absorbed. Moreover, a point on the belt anchor bracket to the seatbelt anchor is moved toward the front side, so that the moment of the lock unit is reduced. Accordingly, the strength of the seatbelt anchor can be increased without increasing the manufacturing cost of the leg.

The vehicle seat may further include a linking bracket made of metal and provided bridging between the upper end portion and the first lower end portion of the belt anchor bracket.

According to the above configuration, the metal linking bracket Is provided bridging between the upper end portion of the belt anchor bracket and the first lower end portion of the belt anchor bracket. Accordingly, the strength of the belt anchor bracket can be enhanced greatly.

The lock unit may include a front lock unit and a rear-lock unit separated from each other in the front-rear direction, and the first lower end portion of the belt anchor bracket may be supported on the rear lock unit rotatably in the front-rear direction.

According to the above configuration, of the front lock unit and the rear lock unit separated from each other in the front-rear direction, the rear lock unit has the first lower end portion of the belt anchor bracket supported thereon rotatably in the front-rear direction. Thus, load applied to the seatbelt anchor in sudden braking or the like is transmitted to the rear lock unit. As a result, the moment of the lock unit is reduced. Accordingly, the leg, the rear Lock unit, and the engagement member do not need to greatly enhance their strength.

BRIEF DESCRIPTION OF DRAWINGS

in FIG. 1.

DESCRIPTION OF EMBODIMENTS

The object of providing a vehicle seat with a seatbelt anchor having improved strength without increasing the manufacturing costs of lock units and a leg is achieved by including: a seat cushion having one side supported on a side panel of a vehicle rotatably in a left-right direction of the vehicle; a leg hanging downward from the other side of the seat cushion and being capable of horizontally holding the seat cushion on a floor panel of the vehicle; a lock unit engageable with and disengageable from an engagement member provided to the floor panel; and a belt anchor bracket having a first lower end portion supported on the lock unit rotatably in a front-rear direction of the vehicle, a second lower end portion fixed to the leg, and an upper end portion supporting a seatbelt anchor rotatably in the front-rear direction.

Hereinbelow, an embodiment of the present invention will be described in detail with reference to FIGS. 1 to 7.

Figure 1:
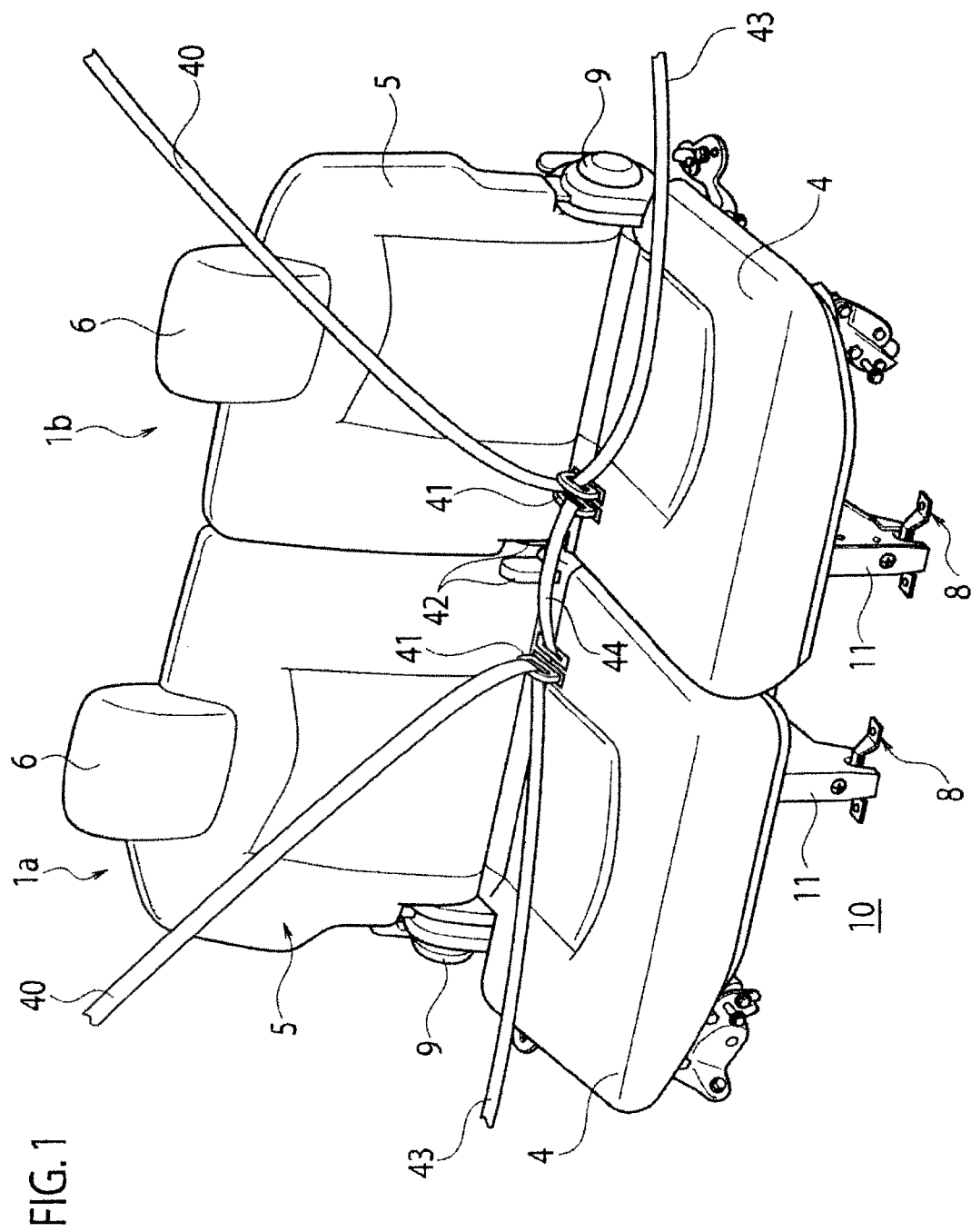
FIG. 1 is an explanatory perspective view of left and right vehicle seats according to an embodiment of the present invention and shows that the vehicle seats are in a position where people can sit thereon.
Figure 2:
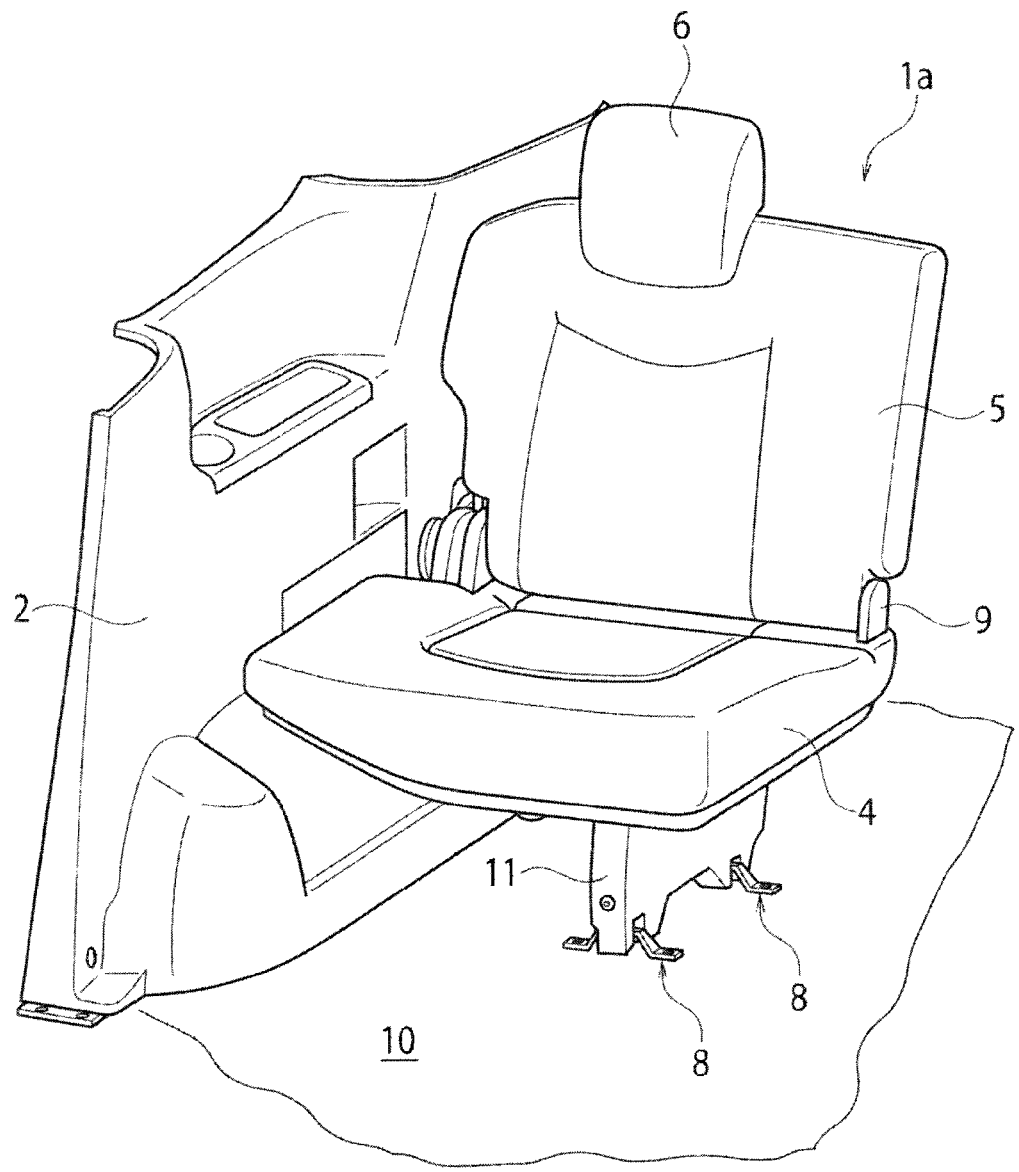
FIG. 2 is a perspective view showing only the right vehicle seat.
Figure 3:
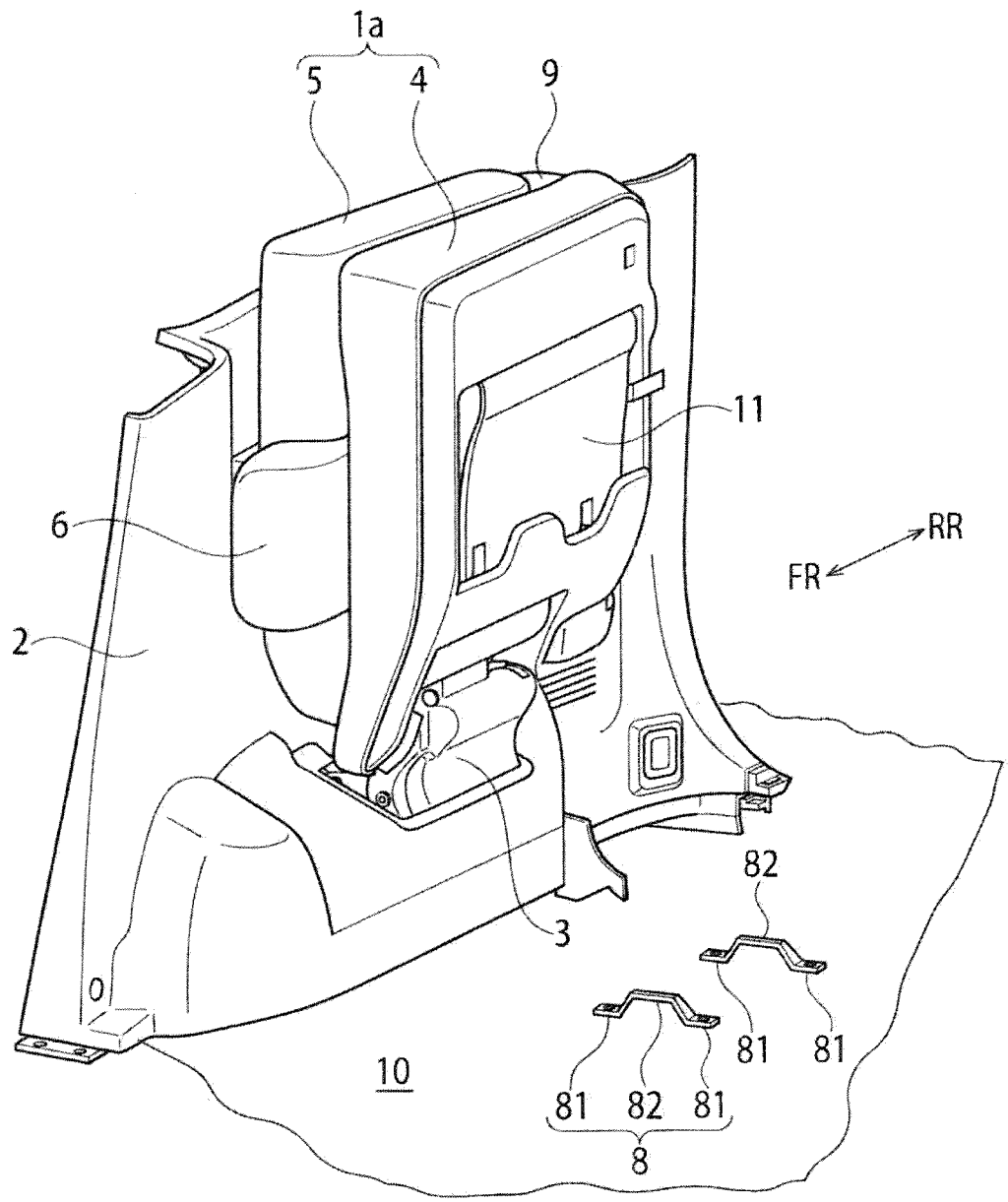
FIG. 3 is an explanatory perspective view of the right vehicle seat shown in FIG. 2 in a raised position.

FIG. 1 shows seats 1a, 1b mounted on a van type automobile as a "vehicle" in a state where three people can be seated thereon side by side. That is, the seats 1a, 1b are 50/50 split seats split into two in the left-right; direction of the one-box type vehicle. The seats 1a, 1b are so-called third seats disposed on the rear side of seats behind a driver seat which are not shown (the seats in the third row from the front). Reference numeral 2 shown in FIG. 2 denotes a side panel. Although FIG. 2 shows only the right side panel 2, there are bilaterally symmetrical side panels 2. As shown in FIG. 3, the seats 1a, 1b are supported on the illustrated side panel 2 and the unillustrated side panel 2 rotatably in the left-right direction of the automobile along the side panels 2 by means of rotation shaft parts 3, respectively. FIG. 3 shows a state where seat cushions 4, 4 of the seats 1a, 1b are raised. The right seat 1a and the left seat 1b have the same configuration except that the configurations differ in the left-right direction. Thus, the following will describe the right seat 1a only.

Figure 4:
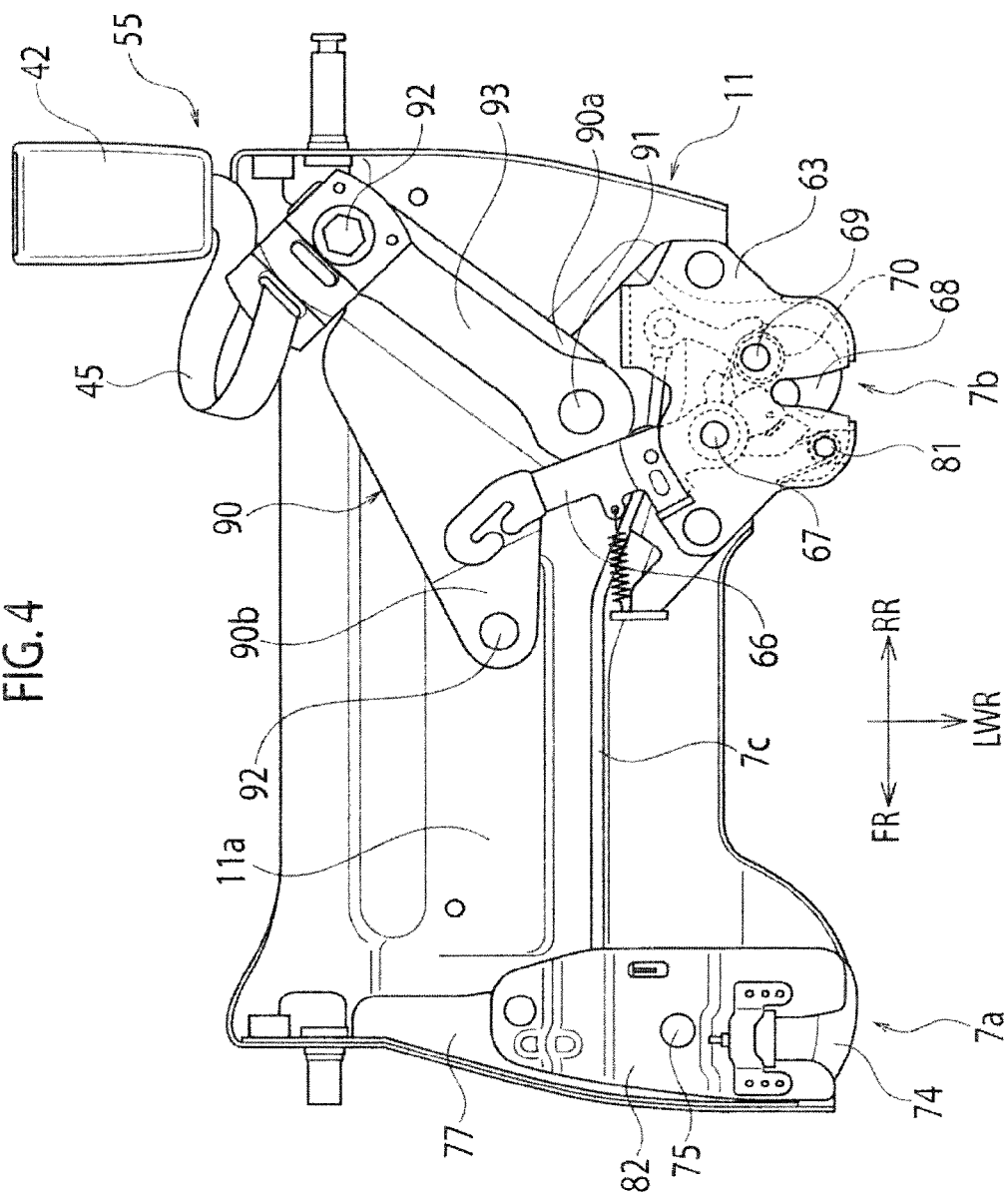
FIG. 4 is an enlarged elevational view showing a leg, lock means, and a seatbelt anchor and a belt anchor bracket in a normal state, of the right vehicle seat shown in FIG. 2.

As shown in FIGS. 1, 2, and 4, the seat cushion 4, when in a state where one can sit thereon, is held on strikers 8, 8 through lock units 7a, 7b, the strikers 8, 8 being engagement members separated from each other in the front-rear direction and fixed to a floor panel 10. The seat cushion 4 in this state is held substantially horizontally by a leg 11 provided on the back side of the seat cushion 4. Reference numeral 5 denotes a seatback foldable toward a front side FR relative to the seat cushion 4. The seatback 5 includes a headrest 6.

As shown in FIG. 3, in a state where the seatback 5 is folded forward relative to the seat cushion 4 and they are raised to the side panel 2, an area of the floor panel 10, which has been covered b the seat cushion 4, is exposed. If a rear side RR of the seat 1a is continuous with a luggage space, this means that the luggage area is increased. As shown in FIG. 3, each striker 9 is formed of support portions 81, 81 welded to and supported on a recessed portion (not shown) of the floor panel 10, and a mountain-shaped bar member 82 formed between the support portions 81, 81. In view of loading luggage, the bar member 82 should desirably not have its upper surface protruding from the general surface of the floor panel 10, but is not limited to this case. Reference numeral 9 denotes a reclining device that allows the seatback 5 to rotate forward and rearward relative to the seat cushion 4 and also to stop at a desired position.

The leg 11 includes: a plate 11a of a steel sheet supported in such a way as to be rotatable between a position shown in FIG. 2 and a position shown in FIG. 3, i.e. a position at which the plate 11a is at 90 degrees with respect to the lower surface of the seat cushion 4 (see FIGS. 1 and 2) and a position at which the plate 11a lies along the lower surface (see FIG. 3); the lock units 7a, 7b provided away from each other oh the front and rear sides FR, RR at a lower end portion of the plate 11a as shown in FIG. 4; and a linking rod 7c linking the lock units 7a, 7b.

The rear lock unit 7b includes a base member 63, a locking plate (not shown), a lock release plate 66, a tooth place 68, a biasing spring 70, and a cover (not shown) covering these from the cabin side. The base member 63 is fixed to the rear side RR and a lower side LWR of the plate 11a. The locking plate (not shown) is supported rotatably about a rotation shaft 67 provided to the base member 63. The lock release plate 66 includes a catch pin (not shown) standing to be caught on an upper end portion (not shown) of the locking plate (not shown). The lock release plate 66 is supported rotatably about the rotation shaft 67 and has its upper end portion biased in a rotational direction by a lock release strap (not shown). The tooth plate 68 is supported rotatably about a rotation shaft 69 provided to the base member 63 and is capable of engaging with and disengaging from the bar member 82 of the striker 8. The biasing spring 70 is wound around the rotation shaft 69 and biases the tooth plate 68 in the clockwise direction in FIG. 4. A biasing spring (not shown) which biases the locking plate (not shown) in the counterclockwise direction in FIG. 4 is wound around a shaft support pin 81 provided to the base member 63.

The front lock unit 7a includes: a reinforcing plate 77 fixed to the front side FR of the plate 11a; a front hook (not shown) supported rotatably about a rotation shaft 75 provided to the reinforcing plate 77; a sound deadening cover 74 fixed to a lower end portion (not shown) of the front hook (not shown); a biasing spring (not shown) wound around the rotation shaft 75 and biasing the front hook (not shown) in the clockwise direction in FIG. 4; and a bracket 82 covering these from the cabin side. Notches formed in lower end portions of the plate 11a, the reinforcing plate 77, and the bracket 82 have dimensions allowing the striker 8 to come in and out of the notches.

Reference numeral 90 denotes a belt anchor bracket made of a steel sheet. One lower end portion 90a of the belt anchor bracket 90 is supported on the lock unit 7b rotatably in the front-rear direction through a pin 91. The other lower end portion 90b of the belt anchor bracket 90 is fixed to the plate 11a of the leg 11 with a rivet 92. A seatbelt anchor 55 is supported on an upper end portion 90c of the belt anchor bracket 90 rotatably in the front-rear direction.

A linking bracket 93 made of metal provided bridging between the upper end portion 90c of the belt anchor bracket 90 and the one lower end portion 90a of the belt anchor bracket 90. The linking bracket 93 is supported by welding on the belt anchor bracket 90 at welds denoted by reference numerals 94 in FIG. 6. Reference numeral 90d in FIG. 6 denotes a flange bending from the upper end portion 90c of the belt anchor bracket 90 and allows positioning of the linking bracket 93 during the welding thereof. Reference numeral 95 in FIGS. 6 and 7 denotes a first foldable portion formed in a portion of the belt anchor bracket 90 excluding the linking bracket 93. Reference numeral 97 in FIGS. 6 and 7 denotes a second foldable portion formed in the belt anchor bracket 90 near the other lower end portion 90b thereof. The first foldable portion 98 and the second foldable portion 97 define a substantially triangular surface 98. As will be described later, impact energy is absorbed by deformation (bend) of the substantially triangular surface 98.

The lock units 7a, 7b are provided away from each other on the front and rear sides FR, RR. The one lower end portion 90a of the belt anchor bracket 90 and the rear lock unit 7b are supported on the shaft of the pin 91.

With the bolt 92, the seatbelt anchor 55 is supported on the upper end portion 90c of the belt anchor bracket 90 supported on the leg 11, rotatably in the front-rear direction. The bolt 92 is screwed in a nut 96. A buckle 42 of the seatbelt anchor 55 is capable of engaging with and disengaging from a tongue plate 41 of each of a shoulder belt 40 and a lap belt 44 shown in FIG. 1, the lap belt 44 being designed for a center passenger (not shown) seated between the seats 1a, 1b. An upper end portion of the shoulder belt 40 is supported on an upper portion of an unillustrated columnar vehicle body through a retractor (not shown). Reference numeral 43 in FIG. 1 denotes a lap belt integral with the shoulder belt 40. A lower end portion of the lap belt 43 is supported on a lower portion of an unillustrated columnar vehicle body (e.g. a side sill) through a retractor (not shown). The lap belt 44 is capable of engaging with and disengaging from the seatbelt anchor 55 provided to the leg 11 and is designed to protect the center passenger seated between the seats 1a, 1b. Like the shoulder belt 40, a lower end portion of a shoulder belt (not shown) is supported on the lap belt 44, the shoulder belt (not shown) having an upper end portion extending toward the ceiling and supported through a retractor (not shown). Reference numeral 45 in FIGS. 4 and 5 denotes a belt supporting the buckle 42.

Next, operation of this embodiment will be described.

Figure 5:
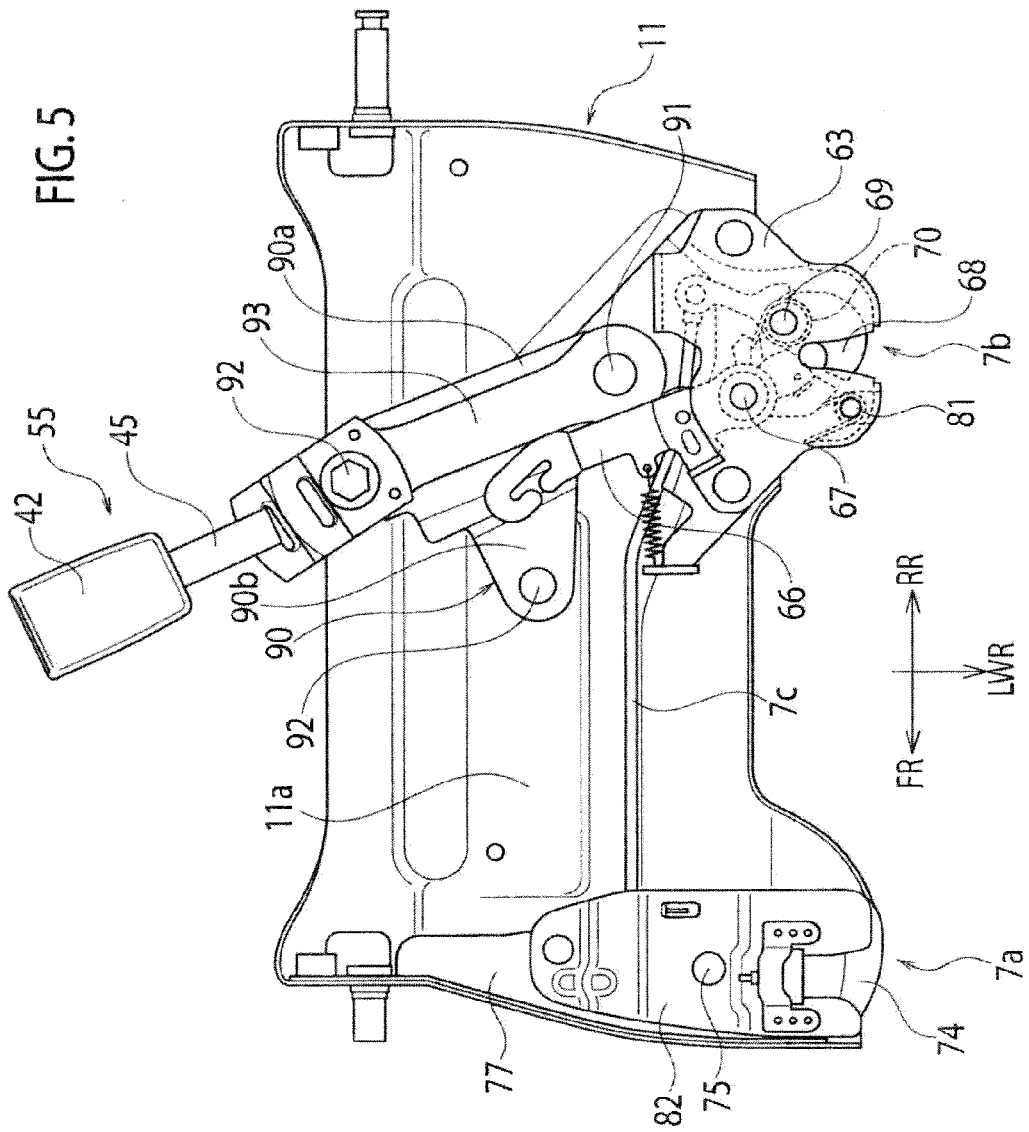
FIG. 5 is enlarged elevational view showing the leg, the lock units, and the seatbelt anchor and the belt anchor bracket at the time of impact, of the right vehicle seat shown in FIG. 2.
Figure 6:
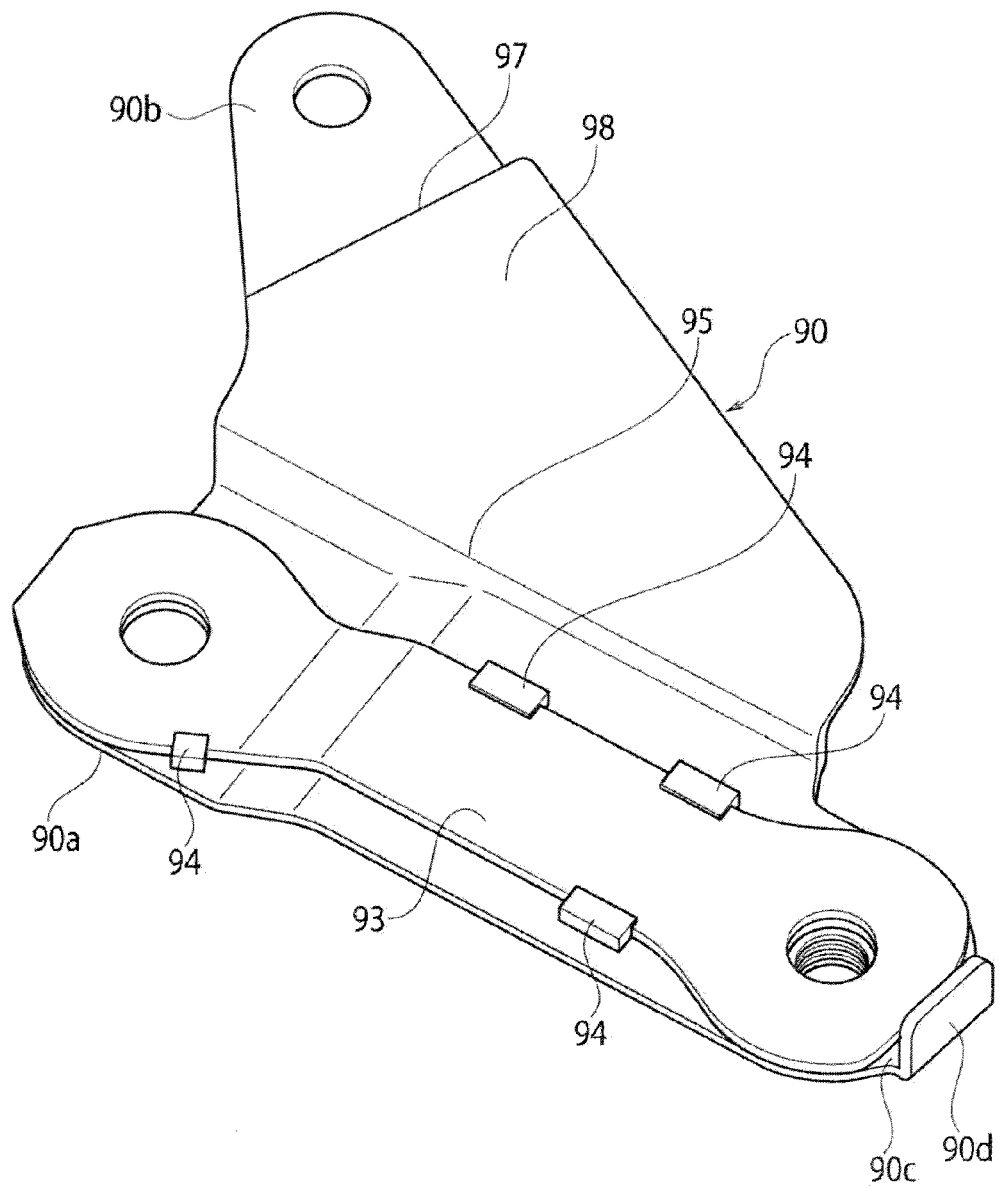
FIG. 6 is a perspective view showing the front surfaces of the belt anchor bracket and a linking bracket bridging over the belt anchor bracket in FIG. 4.
Figure 7:
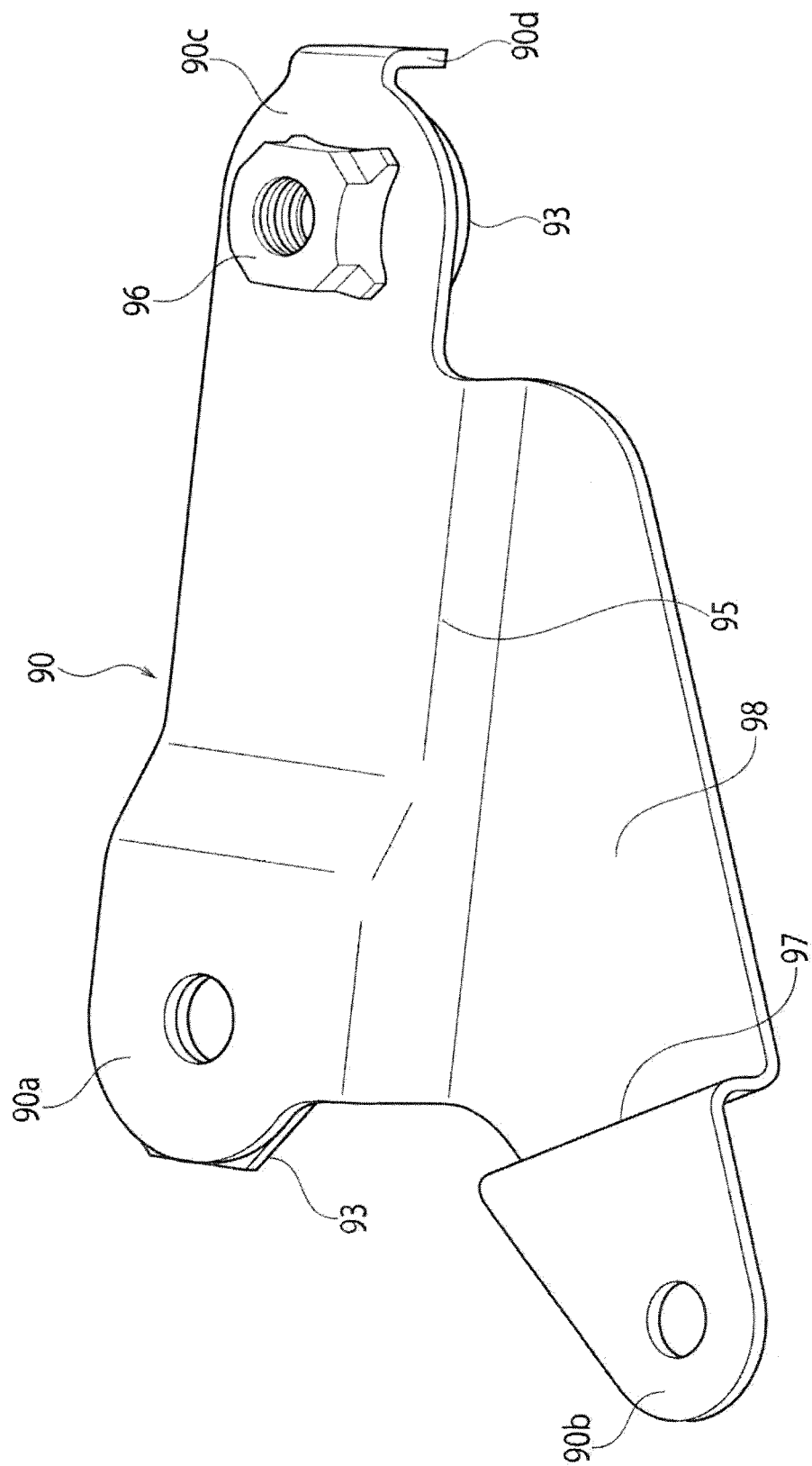
FIG. 7 is a perspective view showing the back surfaces of the belt anchor bracket and the linking bracket in FIG. 6.

The one lower end portion 90a of the belt anchor bracket 90 is supported on the lock unit 7b rotatably in the front-rear direction. The other lower end portion 90b of the belt anchor bracket 90 is fixed to the leg 11. The seatbelt anchor 55 is supported on the upper end portion 90c of the belt anchor bracket 90 rotatably in the front-rear direction. Thus, in a normal state where no load is applied to the seatbelt anchor 55 as shown in FIG. 4, the leg 11 holds the seat cushion 4 substantially horizontally as shown in FIGS. 1 and 2. In a state where load is applied to the seatbelt anchor 55 from a passenger wearing the seatbelt due to sudden braking or the like, deformation occurs at the first foldable portion 95 and the second foldable portion 97 of the belt anchor bracket 90 as shown in FIG. 5, thereby bending the substantially triangular surface 98. As a result, the upper end portion 90c of the belt anchor bracket 90 supporting the seatbelt anchor 55 is moved toward the front side FR. By the deformation (bend) of the substantially triangular surface 98 of the belt anchor bracket 90, the impact energy is absorbed. Moreover, as shown in FIG. 5, the connecting point (bolt 92) of the belt anchor bracket 90 to the seatbelt anchor 55 is moved toward the front side FR, so that the distance between this connecting point and the lock unit 7a on the front side FR (connecting point to the striker 8) is shortened as compared to the state shown in FIG. 4. As a result, the moment between the lock units 7a, 7b is reduced. Accordingly, the strength of the seatbelt anchor 55 can be increased without increasing the manufacturing cost of the leg 11.

The metal linking bracket 93 is provided bridging between the upper end portion 90c of the belt anchor bracket 90 and the one lower end portion 90a of the belt anchor bracket 90. Accordingly, the strength of the belt anchor bracket 90 is enhanced greatly.

Of the lock units 7a, 7b provided away from each other in the front-rear direction, the lock unit 7b on the rear side RR has the one lower end portion 90a of the belt anchor bracket 90 supported thereon through a shaft. Thus, when load toward the front side FR is applied to the seatbelt anchor 55 from a passenger wearing the seatbelt due to sudden braking or the like, that load is transmitted and applied to the lock unit 7b on the rear side RR. As a result, the moment from the lock unit 7a on the front side FR to the lock unit 7b on the rear side RR is reduced. Accordingly, the leg 11, the lock unit 7b on the rear side, and the striker 8 do not need to greatly enhance their strength.

In the foregoing embodiment, the seats 1a, 1b for an automobile have been described as an example of the vehicle seat. However, the present invention is not limited to this case and may be seats mounted on aircrafts, railroad vehicles, watercrafts, and the like. Moreover, the seats 1a, 1b have been described by taking, as an example, the third seats disposed on the rear side of seats behind the driver seat. However, the present invention is not limited to this case and may be seats that are further on the rear side of the third seats.

The invention claimed is:

1. A vehicle seat comprising:
    a seat cushion having one side rotatably supported on a side panel of a vehicle in a left-right direction of the vehicle;
    a leg hanging downward from the other side of the seat cushion and being capable of horizontally holding the seat cushion on a floor panel of the vehicle;
    a lock unit engageable with and disengageable from an engagement member provided to the floor panel; and
    a belt anchor bracket having a first lower end portion rotatably supported on the lock unit for rotation in a front-rear direction of the vehicle, a second lower end portion fixed to the leg, and an upper end portion rotatably supporting a seatbelt anchor for rotation in the front-rear direction, wherein the belt anchor bracket comprises a plate defining a triangle by a first pivot axis at the first lower end portion, a fixing point at the second lower end portion, and a second pivot axis at the upper end portion, which pivot axes and fixing point intersect the plate in three respective locations, wherein the first and second pivot axes are parallel to each other and one of the first and second pivot axes moves closer to the fixing point when during a crash the plate is deformed between the one pivot axis and the fixing point.

2. The vehicle seat according to claim 1, further comprising a linking bracket made of metal and provided bridging between the upper end portion and the first lower end portion of the belt anchor bracket.

3. The vehicle seat according to claim 1,
    wherein the lock unit includes a front lock unit and a rear lock unit separated from each other in the front-rear direction, and
    wherein the first lower end portion of the belt anchor bracket is rotatably supported on the rear lock unit for rotation in the front-rear direction.

* * * * *